Patented May 29, 1928.

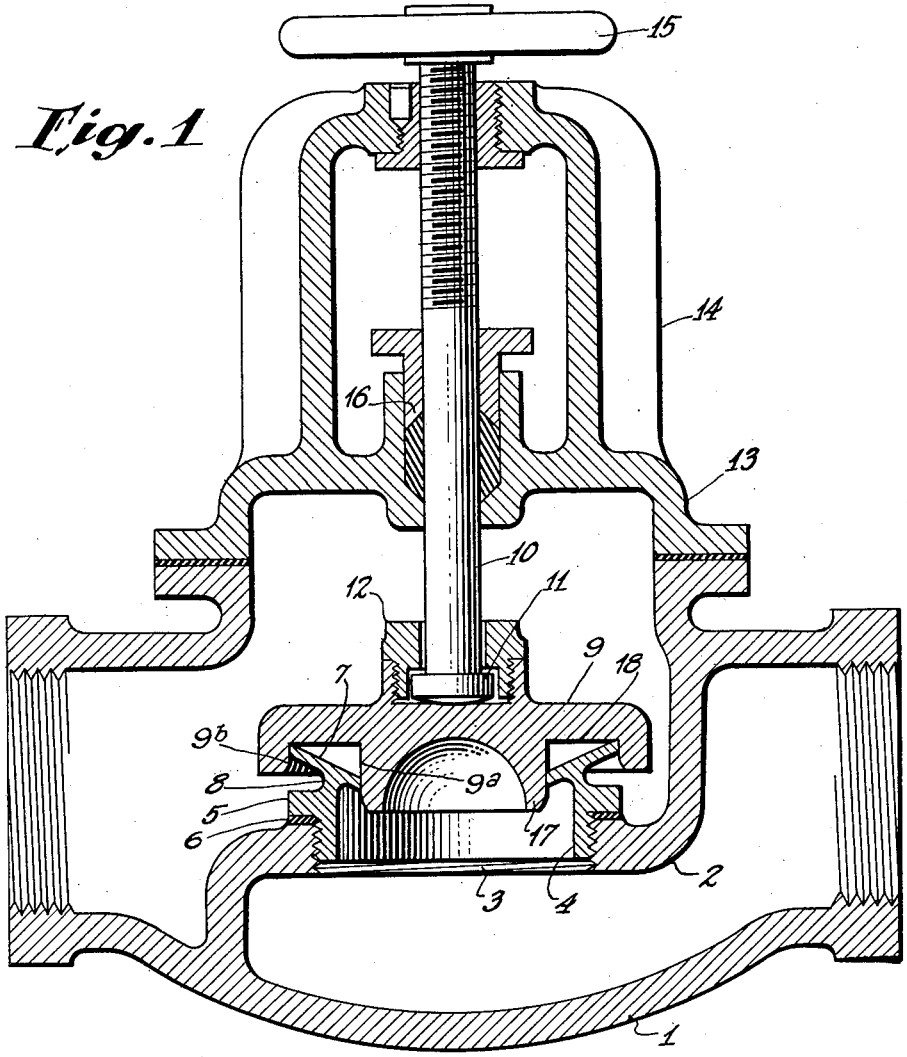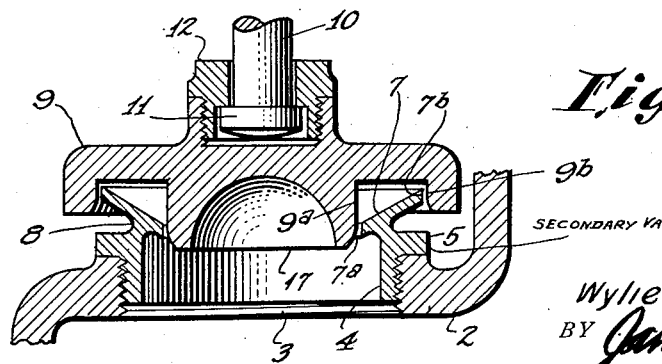

1,671,140

UNITED STATES PATENT OFFICE.

WYLIE G. WILSON, OF JERSEY CITY, NEW JERSEY.

VALVE.

Application filed January 25, 1926. Serial No. 83,423.

This invention is a valve adapted for general application.

In the valve art, it is of fundamental importance that the seal effected by the valve be a tight seal and that the valve be capable of functioning a great number of times without becoming leaky, i. e., it should be repetitive in character, while retaining its capacity to produce a tight seal. While this desideratum has long been recognized, no construction has been heretofore produced which fully meets the requirements.

In valve construction, the seal is effected by two cooperable sealing elements, one of which is generally fixed and the other movable. The former may be termed, for the purposes of the invention, the seat, and the latter, the sealing member.

Pursuant to the practices of the prior art, valve seals have been formed by bringing a rigid sealing member into engagement with a rigid seat, or by forming one of these elements of material which is permanently deformed or distorted in producing the seal, or by interposing a gasket, composed of permanently deformable material, intermediate the sealing member and its seat. In the first instance, difficulties are encountered in accomplishing a tight seal because of irregularities in the two surfaces incident to their construction, to wear, to the presence of foreign matter between them, or to other causes. In the second and third instances, the deformable bodies very soon become so permanently distorted, as a result of wear, physical deterioration or other cause, that they can no longer produce a tight seal. In all the prior art structures, frequent inspection and repairs, at very considerable annoyance and expense, are necessary in order to maintain tight valves.

With these considerations in mind, the primary object of the present invention is to provide a valve capable of effecting a tight seal throughout long periods of repetitive use and under operating conditions, whereunder the valves of the prior art become ineffective after a relatively short period.

Another object of the invention is to so constitute the sealing elements and so operate them, that they may be constructed economically and without that refined workmanship which is usually incident to the grinding of valves and valve seats so that they will cooperate perfectly. The present structures are such that, even though in their primary manufacture they may not be axially coincident with relation to each other or of truly complementary shape, yet in the operation of the valve, they will adjust themselves to such irregularities and compensate for the same by reason of the material from which they are manufactured and the particular form employed in this connection.

Generally speaking, the valve of this invention embodies a sealing element, which preferably, though not necesarily, constitutes the valve seat. This sealing element is in the form of a frustum of a hollow cone and I have discovered that a sealing element of this form will function with remarkable efficiency in the formation of a tight repetitive seal, when constituted from materials which for the purpose of this invention, are termed "obdurate materials". By this term is meant materials which are bendable, but not easily bent, compressible, but not easily compressed, elastic, but not easily deformed. As examples of obdurate material, I may mention, without excluding others, iron, steel, hard alloys (such as bronze), glass, ceramic materials, hard rubber and wood. These materials are in pronounced contradistinction to those, which may be termed "non-obdurate", such as leather, asbestos, soft rubber, soft metals, etc.

The obdurate materials, when employed pursuant to this invention, are operated within their elastic limit, by which I mean that, when embodied in the form of a sealing element and placed under stresses which tend to deform said element, incident to producing a seal, the element shall retain a positive tendency to resume its original form when the stresses are relieved.

I have further discovered that if a sealing element of unbroken hollow frusto conical section is placed under axial compression, which tends to flatten it, the outer periphery of the frusto conical section will expand cross axially and its inner periphery will cross axially contract to bring either or both of said peripheries into engagement with suitable cooperating sealing elements for the purpose of producing a tight seal.

"Unbroken", as used above, may be defined as peripherally continuous; i. e., not slotted or formed into fingers.

By a "hollow frusto conical section", I mean a frusto conical section which is hollowed out to provide a frusto conical shell.

By "axial compression", I mean pressure exerted upon the sealing element in a direction coaxial with or parallel to its axis, whereby its altitude is diminished and the peripheral diameter of its base increased.

Attention is particularly directed to the fact that the stressing of the obdurate sealing element or elements must be within the elastic limit thereof; otherwise said element would not tend to resume (i. e., tend to spring back to) its normal unsealing form. Only an element in the sense of this invention composed of obdurate material and of substantially hollow conical or frusto conical configuration will thus properly function.

The term "elastic limit" as employed in the specification and claims of this application is so employed to designate that quality or characteristic of the conical forms of obdurate material employed which, when compressed within predetermined limits and then relieved of such compression, will cause said conical form to tend to return to approximately its original form and size. It is intended that such compression shall be within and not beyond the tendency of said conical section to return to its original form and size. That is to say, it is intended that the degree of axial pressure employed shall not be sufficient to break down and destroy the resilient or reactive quality of the conical form herein described. On the contrary, it is the purpose in practicing this invention that the degree of compression employed shall be limited to a degree where such reactive characteristic of said conical form will not be seriously affected.

For a better understanding of the operation of a sealing element of hollow frusto conical form of this invention, it is suggested that it functions like a toggle. This analogy is, of course, not absolute, but when considered in that light, it may be helpful to a clearer conception of the operation of the invention. When force is applied to the elbow of a toggle, a greater force is exerted at the ends of the toggle links, and this force increases in proportion as the axial dimension of the toggle, relative to the distance between the ends of the links, becomes less and less.

The sealing element of the present invention may be considered as functioning like a multiplicity of toggles; that is to say, there is a toggle-like action in each diametric plane, and, obviously, there is an infinite number of toggles. When the sealing element is compressed axially, the dimensions of such element and the proportioning of the obdurate material of which it is composed, bring about, within the element, the steadily increasing functional characteristics incidental to toggle action. This action results in a cross axial or radial movement of the sealing element until its peripheries are forced into tight sealing engagement with cooperating seats. The obdurate element, in either case, is so dimensioned and proportioned that the seal is effected, in the manner described, before the elastic limit of the element is reached. Accordingly, upon release of the stresses incident to producing the seal, the element tends to autogenously, i. e., automatically, break the seal.

In practically carrying out the invention, I preferably utilize the obdurate sealing element as a valve seat and mount the seat in normally stationary relation within the valve casing with the hollow frusto conical element attached to or integral with a suitable valve seat ring which is preferably removably secured coaxially of the port which it is desired to seal or unseal. The frusto conical element is secured intermediate its ends to the seat ring so that both the inner and outer peripheries of said element are left free for conjoint cooperation with the sealing member. The sealing member of the valve is preferably of rigid construction and is mounted on a suitable valve stem to be moved axially of the obdurate frusto conical member into and out of engagement with the latter.

The sealing member is preferably formed with an abutment adapted when engaged with the obdurate seat member to preclude further independent movement of the sealing member in a sealing direction, so that pressure thereafter applied to force the sealing member in the direction of the seat will place the hollow frusto conical seat member under axial compression for the purpose of peripherally contracting its inner periphery and expanding its outer periphery into sealing relation with suitable abutments or seats formed on the sealing member and coaxial with the peripheries of the seat member.

The parts are so proportioned that the sealing member may be readily moved into and out of cooperative relation with the seat member without binding, but the fit between the parts is sufficiently close so that when the seat member is axially compressed, a relatively small amount of cross-axial expansion and contraction are required to effect the double sealing relation between the parts as specified.

In accordance with the present invention, the pressure applied through the sealing member to the obdurate seat member is such that the latter member will not be stressed beyond its elastic limit. It is conceivable, however, that through long continued use, and the application of too great a compression to the seat member that said member may in time become crushed or broken down due to its stressing beyond its elastic limit. The present invention further provides for this contingency, remote, but possible, by so forming the seat member that in the event of breaking down thereof, a tight seal may nevertheless be effected and sustained until the desired repairs can be made. This forms an important feature of the present invention, since it provides a positive safeguard against serious damage or danger which, in many cases, would be apt to occur, through failure of the valve to shut off the flow of fluid when desired.

It will thus be apparent that the present invention solves many problems which have long been recognized. It provides for a perfect seal by the application of a minimum of force and this seal may be made and broken a great number of times without excessive wear on the elements of the valve. Moreover, it is characteristic of the invention that when the sealing stresses are relieved, the obdurate sealing element will automatically, i. e., autogenously, tend to return to its original form; that is to say, for all practical purposes, it will return to its unstressed form, though not necessarily to absolutely the same form as it was prior to compression, for it may change slightly under compression. Furthermore, a positive safeguard is provided against damage or danger due to break down of the valve, as a result of long, extended use or unreasonable pressures in the operations of the valve.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a cross section of a valve embodying the present invention. In this view, the parts are shown in normal sealing relation; and Figure 2 is a fragmental view of the sealing elements of the valve of Figure 1 showing the sealing member slightly unseated from its seat.

Referring to the drawings, 1 designates a valve casing having a partition or diaphragm 2 in which is formed a port opening 3. The port opening 3 is threaded to receive the complementarily threaded seat ring 4 through which there is an axial passage. The seat ring is provided with a flange 5 adapted to seat upon the diaphragm adjacent the port opening 3 and a gasket 6 is interposed between the parts to preclude leakage. The flange 5 has an important function in this invention which will be hereinafter more fully explained.

Formed integral with the seat ring is a hollow frusto conical seat member 7 of obdurate material. This member is attached to the ring by a web 8 which is relatively thin so that it may flex or "give" slightly during sealing and unsealing operations, as hereinafter described. The web is united with the seat member intermediate the top and bottom of said member so as to leave both the inner and outer peripheries 7$^a$ and 7$^b$ thereof free.

The sealing member, which is designated 9, is carried by a valve stem 10 provided at its lower end with an enlargement 11, which seats in a pocket formed in a boss coaxially of the sealing member and a retaining nut 12 threads into the pocket for the purpose of securing the sealing element against release from the valve stem.

The valve casing 1 is provided with a suitable bonnet 13 having thereon a yoke 14 through which the valve stem threads. The stem is provided beyond the yoke, with a hand wheel 15, whereby it may be operated and a packing gland 16 cooperates with the stem to preclude leakage at the point where the stem passes through the casing.

As shown in the drawings, the sealing member 9 is provided at its outer periphery with a depending flange or skirt, the inner surface 9$^b$ of which is of substantially the same though slightly greater diameter than the normal unstressed diameter of the periphery of the valve seat member. The sealing member is also provided with a depending cylindrical boss 17, hollowed out to minimize weight, and having a substantially cylindrical surface 9$^a$ of a diameter slightly less than the diameter of the inner periphery of the seat member. All of the surfaces 7$^a$, 7$^b$, 9$^a$ and 9$^b$ are preferably substantially cylindrical and the two latter are thus adapted to perform the functions of seats for the corresponding peripheral edges of the frusto conical seat member. Said surfaces 9$^a$ and 9$^b$ will therefore hereinafter be termed the supplemental seats.

Between the supplemental seats, the lower face of the sealing member is shown as flat and serves the function of an abutment or stop 18, as will be hereinafter explained. The sealing member may be of other forms than that shown, but the configuration described is found in practice to be entirely satisfactory. The surfaces 9$^a$, 9$^b$ and 18 collectively form an annular channel of a size to loosely receive the valve seat 7.

When it is desired to permit the flow of fluid through the valve, the hand wheel 15 is operated to lift the sealing member 9 free from the seat member 7 and well up into the bonnet, so that said sealing member will be removed as far as possible out of the path of the fluid. When the parts are in unsealing condition, the seat member will be unstressed, and, in effect, in neutral condition. When it is desired to seal the valve to stop the flow of fluid pressure, the hand wheel is operated to axially move the valve stem to lower the sealing member 9 into engagement with the seat member 7. This operation continues until the surface or abutment 18 of the sealing member engages with the upper edge of the obdurate seat member 7 and further relative movement between the sealing member and seat member in a sealing direction is precluded. When thus positioned the seat 7 will loosely occupy the channel of the sealing member, as shown in Figure 2.

If, however, the rotation of the hand wheel is continued, and pressure applied to the sealing member, this pressure will be imparted to the frusto conical seat 7 for the purpose of axially compressing said seat and decreasing its altitude and this decrease in altitude will be accompanied by a simultaneous cross axial expansion of the outer periphery 7$^b$ into engagement with the surface 9$^b$. This stressing of the seat to expand its outer periphery causes the wall of said seat to be tilted on the web 8, acting as a fulcrum, to bring about a contraction of the inner periphery 7$^a$ of the seat, whereby it is engaged with the surface 9$^a$. Thus, through the stressing of the obdurate frusto conical section, its free edges or peripheries will be expanded and contracted into tight sealing relation with the supplemental seats 9$^a$ and 9$^b$ of the sealing member. Slight irregularities in the supplemental seats 9$^a$ and 9$^b$ or the peripheral edges 7$^a$ and 7$^b$ will not interfere with the production of a tight fluid impervious seal and even though the cooperating parts may be slightly out of round or out of exact coaxial relation, the seal will nevertheless result as the obdurate seat will compensate for such irregularities. The relatively loose mounting of the sealing member on the valve stem further serves to permit proper cooperation of the parts in the formation of the tight seal desired.

It will be noted that when the sealing member 9 is moved into engagement with the seat, at the commencement of the sealing operation, the seat will enter between the flange and boss of the sealing member, and effect a primary closure prior to the actual stressing of the seat. As this operation is rapidly accomplished, the flow of fluid through the seat passage is quickly shut off and wire drawing effects are minimized.

I have found as a result of exhaustive experimentation that by the employment of a hollow frusto conical seat member of obdurate material a repetitive seal is produced without requiring the usual grinding operations heretofore considered essential in the making of valves and valve seats. Thoroughly satisfactory results can be obtained in the construction described by machining the sealing member and the seat as is usual in the art without the grinding heretofore deemed essential.

So long as the valve is in sealing condition, the obdurate seat member 7 will remain in stressed condition. However, if the valve stem is unscrewed and the axial pressure on said member relieved, the stresses to which I have referred will automatically, i. e., autogenously, result in the shifting of said member into unstressed condition and will bring about within the member a return, at least in degree, towards its previous unstressed condition. As a result of this operation, the seal will be automatically broken and the sealing member 9 may be readily returned, without binding, into unsealing position to permit the flow of fluid through the valve.

The valve may be operated a great number of times in the manner described, provided that the obdurate seat member is not stressed beyond its elastic limit. Under proper and intelligent operation of the valve, stressing beyond the elastic limit will not occur in practice, except possibly after long continued use due to fatigue of the obdurate material of which the frusto conical section is constructed. However, it is possible that through improper operation of the valve, sufficient force may be applied to the valve stem to break down or destroy the resilient or reactive quality of the frusto conical seat member. Great force would be required to accomplish this, but if it occurred, the conical element 7 will be flattened out so that it would not form a proper seal and leakage would be apt to result.

To guard against this eventuality and render the valve safe under even the most adverse conditions, the flange 5 of the valve seat ring is provided. The peripheral surface of this ring is adapted to cooperate with the internal surface 9$^b$ of the overhanging flange of said sealing element to form a seal, and the top surface of the ring 5 is adapted to cooperate with the surface 18 of said sealing element, so that when the conical element is crushed it will lie between said surfaces; at the same time the periphery of the ring 5 and the surface 9$^b$ will engage, thus forming a double seal, sufficient to control the flow of fluid pending repairs.

Experience has shown that when a valve is constructed in the manner described, a thoroughly efficient seal is produced. This seal is truly repetitive in that the parts may be operated a great number of times without developing leaky conditions. In the preferred manner of carrying out the invention, the frusto conical seat is preferably provided with a wall which is substantially straight and I have found that the best results are obtained when the sealing element has sides so shaped. I am aware, however, that some of the advantages of my invention may be obtained through the employment of a sealing element of obdurate material having other than straight sides such, for example, as truncated, hollow, spherical or elliptical sections, but, in practice, they are not so desirable as the straight sided form to which I have referred.

The tendency of the frusto conical seat member of obdurate material to autogenously return, or tend to return, to its original form after compression is relieved is of primary importance. As previously stated, such a retraction does not necessarily involve a return of the element to exactly the same form as prior to compression, but to approximately that same form when considered from a practical standpoint. Such a tendency to return or spring back satisfies the practical requirements of the present invention. The resilient quality of the obdurate material from which the hollow, frusto conical element is made lends itself to repeated action and reaction through an extended period of operation and imparts to the valve the repetitive characteristics to which I have referred.

The foregoing detailed description sets forth the invention in its preferred, practical forms, but the invention is to be understood as fully commensurate with the appended claims.

The expression "conical section", as found in the appended claims, is to be given a sufficiently broad interpretation to include not only the straight sided frusto conical form illustrated in the drawings, but all of the other forms of the invention herein referred to.

For purposes of illustration, the space between the external and internal peripheries of the conical element 7 and the sealing faces 9ᵃ and 9ᵇ is shown enlarged. In practice this space is reduced to a minimum, a close sliding fit is preferable between said surfaces, so that when axial pressure is applied to the conical element a very slight pressure will cause said surfaces to positively engage; hence the tilting of the conical element will be slight, and conseqently the strain on the supporting web 8 will be minimized. Under normal conditions a slight axial compression is sufficient to accomplish a satisfactory seal.

Claims:

1. In a valve, a valve seat formed of obdurate material and integral, such seat being in the form of a hollow frustum of a cone, with a cylindrical web dependent therefrom from a point intermediate its internal and external peripheries, said web being axially mounted with respect to the valve port, a sealing element axially mounted with respect to said seat and means to operate the same in the line of said axis, said sealing element being provided with a valve seat adapted to cooperate with said frusto-conical seat.

2. In a valve, a valve seat formed of obdurate material and integral, such seat being in the form of a hollow frustum of a cone with a cylindrical web dependent therefrom from a point intermediate its internal and external peripheries, said web being axially mounted with respect to the valve port, a sealing element axially mounted with respect to said seat and means to operate the same in the line of said axis, said sealing element being provided with a valve seat, comprising a cylindrical aperture closed at one end by a head and adapted to receive said frusto-conical element and form a seal therewith.

3. In a valve, an integral valve seat formed of obdurate material, such seat being in the form of a hollow frustum of a cone with a cylindrical web dependent therefrom from a point intermediate its internal and external peripheries, with an annular shoulder or ring secured to the base of said web, said ring being axially mounted with respect to the valve port, a sealing element axially mounted with respect to said seat, and means to operate the same in the line of said axis, said sealing element having a cylindrical recess closed at one end by a head, said recess adapted to receive said frusto-conical valve seat and form a primary seal by the walls of said recess therewith under normal conditions, and also adapted to receive said ring under abnormal conditions and form a secondary seal.

Signed by me at Jersey City, N. J. this 20th day of January, 1926.

WYLIE G. WILSON.